(12) United States Patent
Conrad et al.

(10) Patent No.: US 11,032,973 B2
(45) Date of Patent: Jun. 15, 2021

(54) BATTERY-OPERATED ELECTRIC MOWER

(71) Applicant: Generac Power Systems, Inc., Waukesha, WI (US)

(72) Inventors: Joseph C. Conrad, Okeana, OH (US); Matthew C. Conrad, Okeana, OH (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 16/522,823

(22) Filed: Jul. 26, 2019

(65) Prior Publication Data

US 2021/0022291 A1 Jan. 28, 2021

(51) Int. Cl.
| A01D 34/00 | (2006.01) |
| A01D 69/02 | (2006.01) |
| A01D 34/685 | (2006.01) |
| A01D 34/66 | (2006.01) |

(52) U.S. Cl.
CPC ............. *A01D 69/02* (2013.01); *A01D 34/66* (2013.01); *A01D 34/685* (2013.01)

(58) Field of Classification Search
CPC ........ A01D 34/82; A01D 34/64; A01D 69/02; A01D 34/66
USPC ........................................................ 180/65.1
See application file for complete search history.

(56) References Cited

U.S. PATENT DOCUMENTS

| 3,732,671 A * | 5/1973 | Allen ..................... A01D 34/64 56/10.2 R |
| 4,622,714 A | 11/1986 | Tomasello |
| 4,866,320 A | 9/1989 | Schulz |
| 4,969,102 A | 11/1990 | Tamura et al. |
| 5,007,234 A | 4/1991 | Shurman |
| 5,011,058 A | 4/1991 | Sapp et al. |
| 5,195,208 A | 3/1993 | Yamami et al. |
| 5,238,267 A * | 8/1993 | Hutchison .............. A01D 34/82 280/781 |

(Continued)

FOREIGN PATENT DOCUMENTS

WO 2016109860 7/2016

OTHER PUBLICATIONS

Website screenshot chrome-extension://nlipoenfb-bikpbjkfpfillcgkoblgpmj/edit.html; captured Apr. 24, 2019.

(Continued)

*Primary Examiner* — Hau V Phan
(74) *Attorney, Agent, or Firm* — Madeline Schlederer; Godfrey & Kahn. S.C.

(57) ABSTRACT

A battery-operated electric mower having a chassis that supports at least an operator support and a first and second drive wheel, each drive wheel respectively connected to one of a first and a second drive wheel motor. The first drive wheel motor may be connected to the first drive wheel by a first gear mechanism, which may include a first system of planetary gears, and the second drive wheel motor may be connected the second drive wheel by a second gear mechanism, which may include a second system of planetary gears. The chassis also supports a battery pack positioned, at least in part, within the same horizontal plane as at least one of the drive wheel motors. The battery may be positioned, at least in part, between the first drive wheel motor and the second drive wheel motor, significantly lowering the mower's center of gravity.

4 Claims, 15 Drawing Sheets

(56) References Cited

U.S. PATENT DOCUMENTS

| | | | |
|---|---|---|---|
| 5,406,778 A | 4/1995 | Lamb et al. | |
| 5,502,957 A * | 4/1996 | Robertson | A01D 34/6806 56/10.2 G |
| 5,547,341 A | 8/1996 | Amin | |
| 5,813,088 A | 9/1998 | Wagner et al. | |
| 5,934,051 A * | 8/1999 | Hahn | B60K 28/04 56/10.2 R |
| 6,006,400 A | 12/1999 | Presenza | |
| 6,305,048 B1 | 10/2001 | Salisian | |
| 6,339,916 B1 | 1/2002 | Benson | |
| 6,370,729 B2 | 4/2002 | Miyamoto | |
| 6,526,624 B2 | 3/2003 | Miyamoto | |
| 6,592,329 B1 | 7/2003 | Hirose et al. | |
| 6,640,384 B2 | 11/2003 | Sanders et al. | |
| 6,843,639 B2 | 1/2005 | Schuett | |
| 7,055,213 B2 | 6/2006 | Iida et al. | |
| 7,077,078 B2 | 7/2006 | Yuasa et al. | |
| 7,096,597 B1 | 8/2006 | Zellous | |
| D533,266 S | 12/2006 | Yoshida et al. | |
| 7,578,116 B1 | 8/2009 | Howell | |
| 7,621,019 B2 | 11/2009 | Kremsler et al. | |
| 7,721,384 B2 | 5/2010 | Crevling, Jr. et al. | |
| 7,866,944 B2 | 1/2011 | Kenyon et al. | |
| 8,191,342 B2 * | 6/2012 | Ishii | B60K 7/0015 56/11.9 |
| 8,544,570 B2 * | 10/2013 | Ishii | B60L 50/40 180/6.5 |
| 8,579,058 B1 | 11/2013 | Yamada et al. | |
| 8,740,027 B2 | 6/2014 | Manor et al. | |
| 8,844,658 B2 * | 9/2014 | Wyatt | A01D 34/64 180/6.48 |
| 8,880,300 B2 | 11/2014 | Gamble et al. | |
| 8,984,711 B2 | 3/2015 | Ota et al. | |
| 9,057,166 B2 | 6/2015 | Prager | |
| 9,127,691 B2 | 9/2015 | Hagen et al. | |
| 9,288,942 B2 * | 3/2016 | Moriguchi | B60L 1/003 |
| 9,332,694 B2 | 5/2016 | Prager | |
| 9,486,120 B2 | 11/2016 | Day | |
| 9,499,199 B1 | 11/2016 | Layman et al. | |
| 9,699,965 B2 * | 7/2017 | Schygge | B60L 50/66 |
| 9,915,324 B2 * | 3/2018 | Shoji | B60W 10/02 |
| 10,130,037 B2 | 11/2018 | Conrad et al. | |
| 2004/0135373 A1 | 7/2004 | Osborne | |
| 2006/0059879 A1 | 3/2006 | Edmond | |
| 2007/0220702 A1 | 9/2007 | Lauer et al. | |
| 2007/0294855 A1 | 12/2007 | Iida et al. | |
| 2008/0001966 A1 | 1/2008 | Zhang | |
| 2008/0086997 A1 | 4/2008 | Lucas | |
| 2009/0096178 A1 | 4/2009 | Beal | |
| 2010/0154373 A1 * | 6/2010 | Newell | A01D 34/82 56/14.7 |
| 2010/0236845 A1 | 9/2010 | Ishii et al. | |
| 2011/0289896 A1 * | 12/2011 | Sasahara | A01D 69/02 56/11.9 |
| 2012/0061153 A1 | 3/2012 | Porter | |
| 2012/0227368 A1 | 9/2012 | Koike | |
| 2012/0265391 A1 | 10/2012 | Letsky | |
| 2013/0004307 A1 | 1/2013 | Fukuda et al. | |
| 2013/0268165 A1 | 10/2013 | Hashima | |
| 2013/0280108 A1 | 10/2013 | Bearup et al. | |
| 2014/0067172 A1 | 3/2014 | Harris, III | |
| 2014/0102062 A1 | 4/2014 | Sandin et al. | |
| 2014/0288750 A1 | 9/2014 | Lankin et al. | |
| 2015/0182082 A1 | 7/2015 | Garcia-Otero | |
| 2015/0377253 A1 | 12/2015 | Shibata et al. | |
| 2016/0108924 A1 | 4/2016 | Conrad et al. | |
| 2016/0183451 A1 * | 6/2016 | Conrad | A01D 34/66 56/10.2 R |
| 2016/0298635 A1 | 10/2016 | Su et al. | |
| 2018/0192580 A1 * | 7/2018 | Zeiler | A01D 34/66 |
| 2018/0338415 A1 * | 11/2018 | Wyatt | B60L 15/20 |

OTHER PUBLICATIONS

International Search Report for PCT/US2016/020109; dated May 2, 2016.

International Search Report for PCT/US2020/070220 dated Sep. 9, 2020.

* cited by examiner

BATTERY-OPERATED ELECTRIC MOWER

FIELD

This invention relates to machinery for lawn care, and in particular to battery-operated electric lawn mowers.

BACKGROUND

Gasoline mowers have been used extensively to address lawn care needs. Unfortunately, gasoline mowers have numerous disadvantages. More particularly, internal combustion engines produce significant emissions and pollutants into the air. In addition, they require several fluids to operate, which over time, can result in a leakage of harmful fluids into the environment.

Electric mowers have been introduced to address many of these issues. Unfortunately, current electric mower designs also include certain drawbacks. More particularly, many require use of an AC voltage power cord, which severally limits their range. Alternatively, some electric mowers use batteries as a power source. However, such batteries add weight to the mower, and many have low power to weight ratios, which can generate a need, in some instances, for heavy and bulky battery packs to sufficiently power the mower. As such, the positioning of a battery-operated electric mower's battery packs can significantly impact the location of the mower's center of gravity.

FIGS. 1 and 2 show the positioning of a series of battery packs in a prior art electric mower 2, described in U.S. Pat. No. 10,130,037. FIG. 1 shows a partial rear elevation view of the prior art electric mower 2, with some elements omitted for clarity. The electric mower 2 has a chassis 12, with drive wheels 22 positioned on each side of the chassis 12 and two electric drive wheel motors 42 positioned between the drive wheels 22, each drive wheel motor 42 mechanically coupled to one of the drive wheels 22 by a gear reduction axle 44. A plurality of battery packs 26 rest on a battery floor 62 located in an elevated position above the drive wheel motors 42 and gear reduction axles 44. Thus, the height of the battery packs 26 with respect to a ground surface is limited in a downward direction by the presence of the drive wheel motors 42 and the gear reduction axles 44. FIG. 2 shows a partial bottom view of the same prior art electric mower shown in FIG. 1, with some elements omitted for clarity. Here again, the drive wheel motors 42 and gear reduction axles 44 are shown positioned between the drive wheels 22, underneath the battery packs 26. The battery floor 62 has been omitted to reveal the plurality of battery packs 26.

BRIEF SUMMARY OF THE INVENTION

With respect to mowers, a lower center of gravity is generally more desirable than a higher center of gravity. Lowering the center of gravity, among other things, can increase the overall stability of the mower and the bank angle at which the mower may safely travel without overturning. It is additionally beneficial for a mower to be compact, as increased compactness may, among other things, increase the maneuverability of a mower during operation and the storability of a mower post operation. Therefore, structuring a battery-powered electric mower to house battery packs at a lower height relative to the ground surface can be desirable, as can structuring the mower to house the battery packs in a more forward position with respect to the front of the mower.

In certain aspects, the present invention provides a battery-powered mower with a lowered center of gravity. In accordance with some forms of the invention, the batteries are configured to achieve the lowered center of gravity. Accordingly, in one embodiment, the present invention provides a battery-operated mower that includes a first and a second drive wheel connected to a chassis. An operator support for supporting an operator is also connected to the chassis. A first drive wheel motor is connected to the first drive wheel, and a second drive wheel motor is connected to the second drive wheel. A battery pack, supported by the chassis, is positioned at least in part between the first drive wheel motor and the second drive wheel motor.

In another embodiment, the invention provides a battery-operated mower, having a chassis. A drive wheel motor is connected to an exterior portion of the chassis. A gear mechanism is mechanically coupled to the drive wheel motor. And a drive wheel is connected to the gear mechanism. Additionally, a battery pack is electrically connected to the drive wheel motor. The battery pack is positioned at least in part within the same horizontal plane as the drive wheel motor.

In a further embodiment, the invention provides a battery-powered mower, including a chassis, with an operator support for supporting an operator connected to the chassis. Further, a first electric drive wheel motor is secured to a first exterior surface of the chassis. A first planetary gear reduction box, including a first system of planetary gears, is mechanically coupled to the first electric drive wheel motor, and a first drive wheel is secured to the first planetary gear reduction box. The first drive wheel surrounds at least a portion of the first electric drive wheel motor and at least a portion of the first planetary gear reduction box. Additionally, a second electric drive wheel motor is secured to a second exterior surface of the chassis. A second planetary gear reduction box, including a second system of planetary gears, is mechanically coupled to the second electric drive wheel motor. And a second drive wheel is secured to the second planetary gear reduction box. The second drive wheel surrounds at least a portion of the second electric drive wheel motor and at least a portion of the second planetary gear reduction box.

Other objects and advantages of the present disclosure will become apparent hereinafter.

BRIEF DESCRIPTION OF THE DRAWINGS

Embodiments of the battery-operated electric mower are disclosed with reference to the accompanying exemplary drawings, which are for illustrative purposes. Various portions or components of the apparatus may be omitted from illustration in one or more FIGS. to improve clarity or to provide a view of underlying components. The battery-operated electric mower is not limited in application to the details of construction or the arrangement of the components illustrated in the drawings. The battery-operated electric mower is capable of other embodiments or of being practiced or carried out in various other ways. In the drawings.

DETAILED DESCRIPTION

Figure 1:
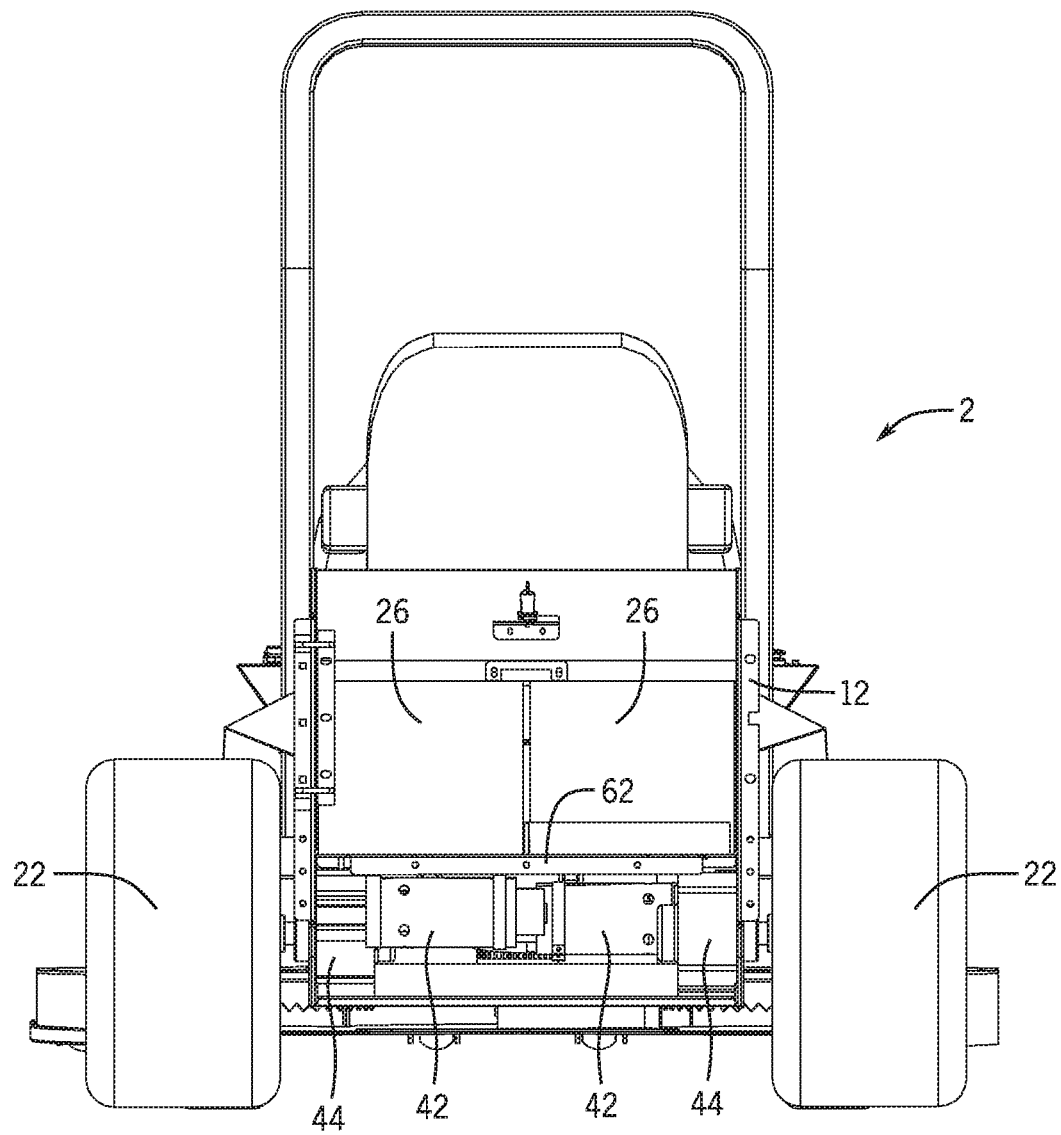
FIG. 1 is a rear elevation view of a prior art mower with various portions removed for clarity.
Figure 2:
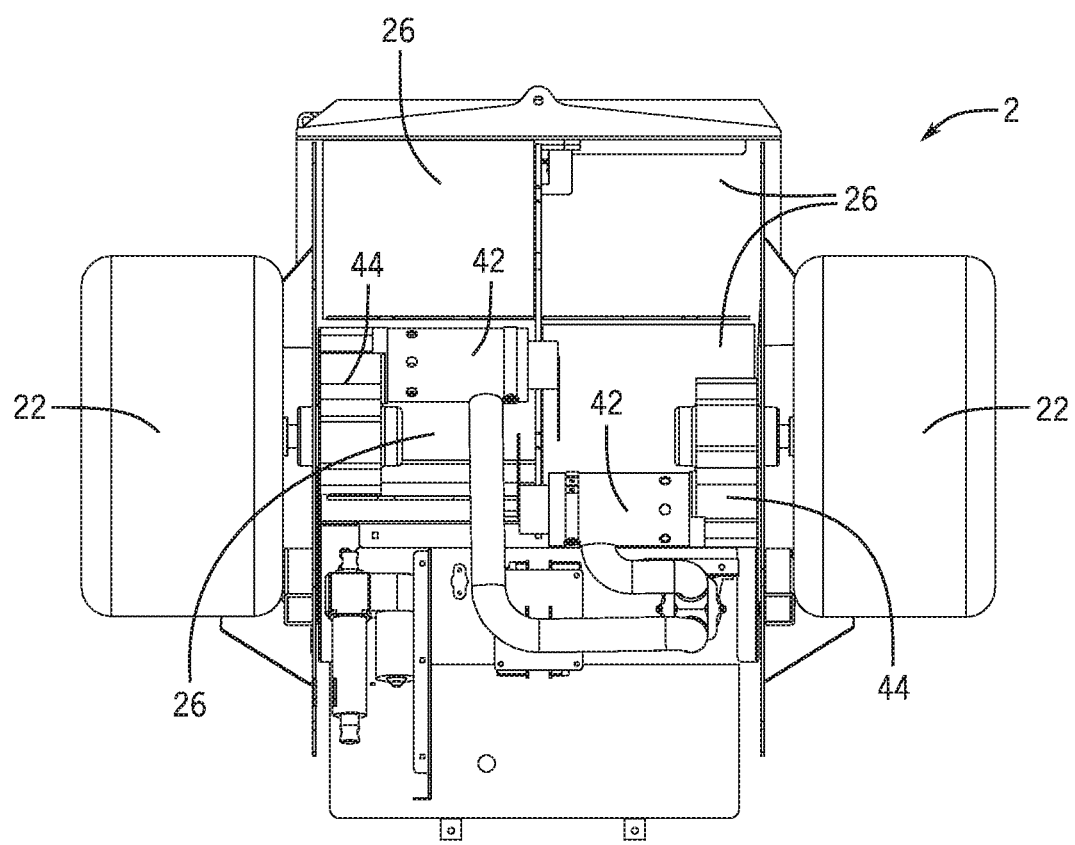
FIG. 2 is a partial bottom view of the prior art mower of FIG. 1 with various portions removed for clarity.
Figure 3:
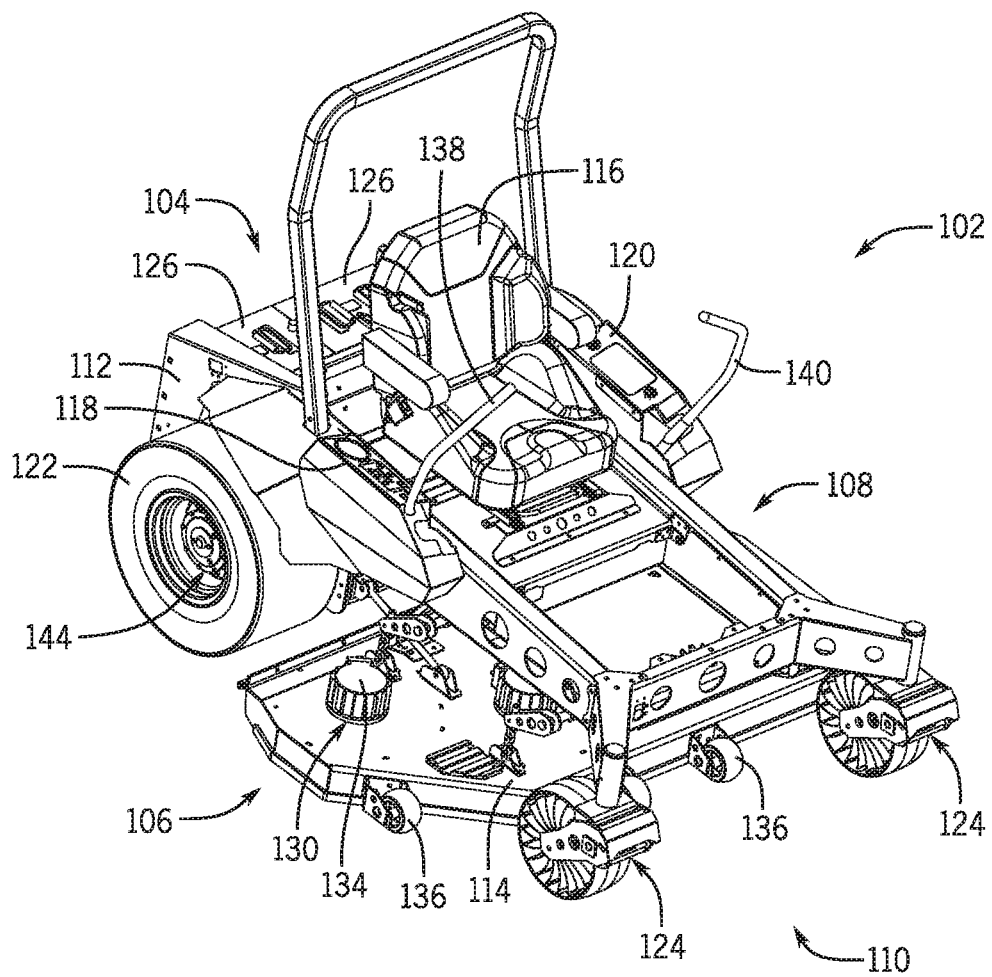
FIG. 3 is a top front perspective view of a mower, according to one embodiment of the present disclosure.
Figure 4:
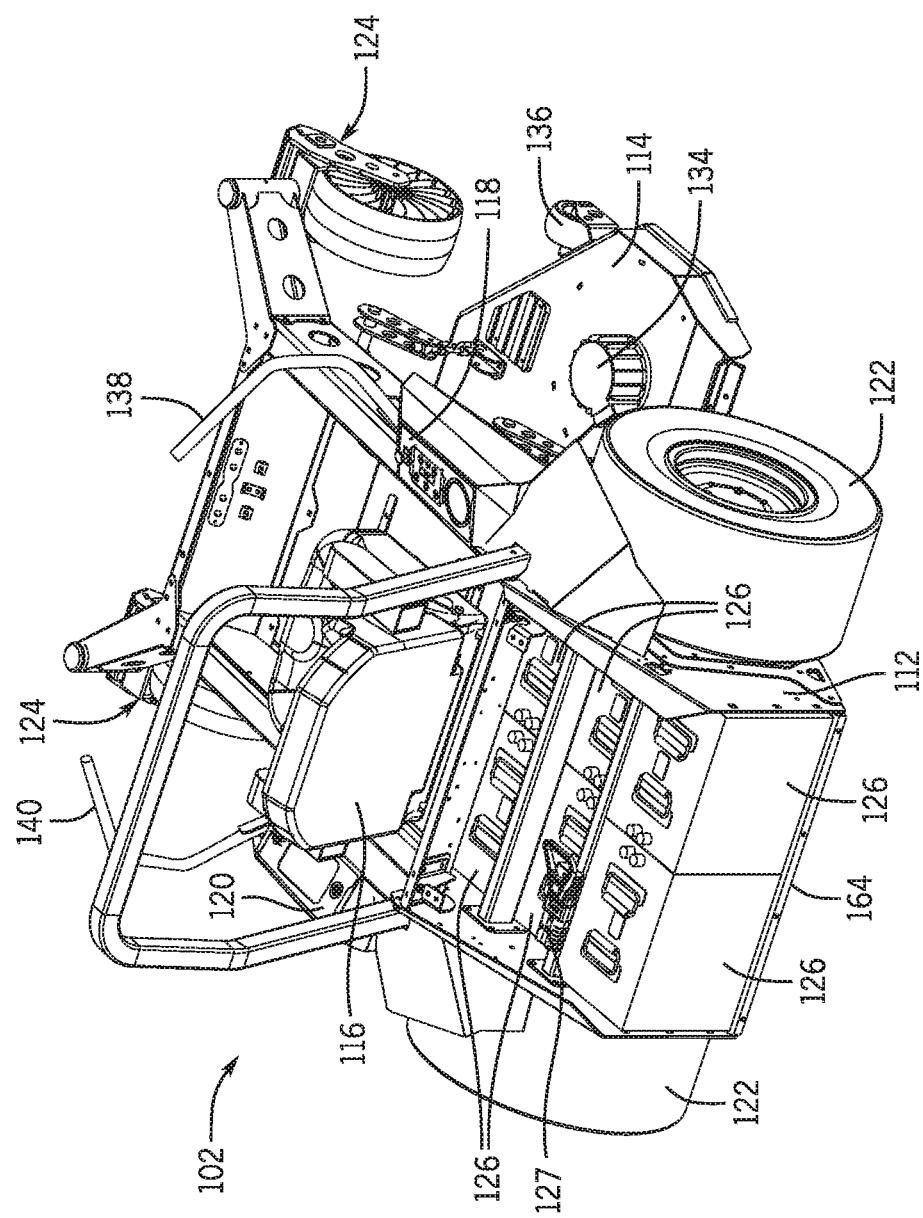
FIG. 4 is a top rear perspective view of the mower of FIG. 3.

Referring to FIGS. 3-12, numerous perspective and elevation views of a battery-powered electric mower 102 are provided, as described above. For reference, a rear 104, a right side 106, a left side 108, and a front 110 are identified in FIG. 3.

The mower 102 includes a chassis 112 that consists of numerous structural members secured together to form a framework (i.e., a frame) for interconnecting various components of the mower 102, such components including but not limited to a mower deck 114, an operator support 116, a right side operator control panel 118, a left side operator control panel 120, a plurality of drive wheels 122, and a plurality of front support wheel assemblies 124 that each may include a swivel mount and a wheel. The chassis 112 also houses one or more battery packs 126 (FIGS. 3-5, 7B, and 9-12) for powering various electrical components of the mower, for example, drive wheel motors, blade motors, etc. In the illustrated embodiment, the mower 102 includes six battery packs 126. However, in other embodiments, more or fewer battery packs 126 may be included, based on factors such as the power output of a given battery pack 126 and the power needs of a given electric mower 102.

In a least some embodiments, the mower 102 may include one or more operator control panels 118, 120 configured to provide a plurality of operator actuatable controls and annunciators, for example, for controlling main power, engaging cutting blade operations, adjusting the deck height, etc. In at least some embodiments, these operator control panels 118, 120 are located on opposite sides of the operator support 116, within easy reach of an operator. In the illustrated embodiment, the operator support 116 is shown as a sitting chair, although in other embodiments, the operator support 116 may be one of various other types of supports, for example, a standing pad, and the position of the operator control panels 118, 120 may be accordingly adjusted, if necessary, to maintain operator accessibility.

Figure 5:
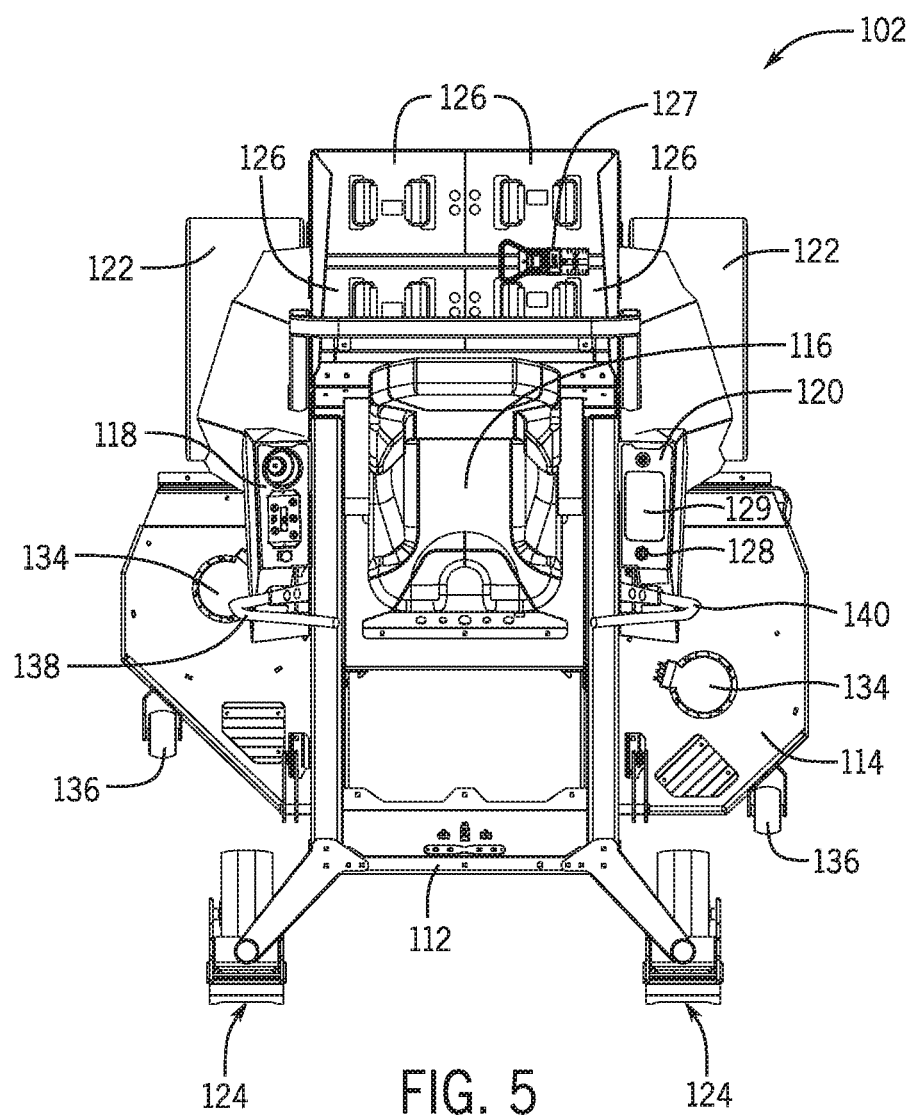
FIG. 5 is a top plan view of the mower of FIG. 3.
Figure 6:
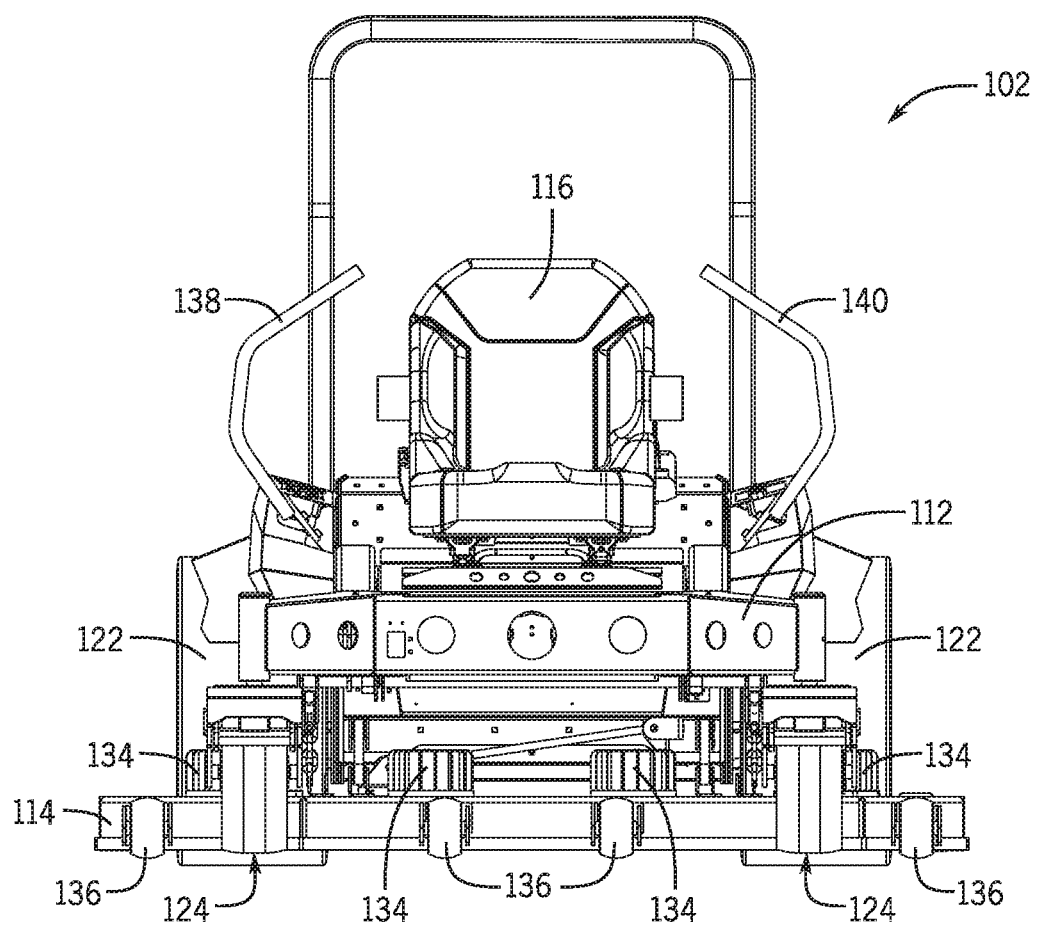
FIG. 6 is a front elevation view of the mower of FIG. 3.

Referring to FIG. 5, in some embodiments, an ON/OFF key switch 128 may be provided on one of the operator control panels 118, 120 to direct power from the battery packs 126 to the electrical components of the mower 102. In the present embodiment, the ON/OFF key switch 128 is shown on the left side operator control panel 120. As an alternative to using a key switch, in some embodiments, the power may be controlled from a touchscreen 129. In certain embodiments, the touch screen 129 may produce a keypad when activated (for example, by the push of a button), and power to the mower 102 may be triggered by the entering of a particular code onto the keypad. In alternative embodiments, the keypad may be a separate element from the touch screen 129. The touch screen 129 may further relate information with regard to the battery packs 126, such as the state of charge (similar to a fuel gauge on a gas lawn mower), the time and/or percent remaining in the battery, and/or individual battery cell voltages and/or temperatures. Additionally, the touch screen 129 may relay to the operator service reminders, current (amp) usage, average current draw, drive speed position (high and low range), blade speed (high and low), lights (on and off), diagnostic information relating to potential faults in the system, and/or service reminders.

The deck 114 provides a sturdy structure for which to mount other components, such as a plurality of electric blade motors 130, each having a respective cutting blade 132, with each cutting blade 132 secured to the output shaft of a respective blade motor 130. In some embodiments, the battery packs 126 supply power to the blade motors 130. The blade motors 130 each include motor casings 134, which are shown protruding through the top of the deck 114. The deck 114 may also include a plurality of free-wheel support rollers 136 for support of the deck as the mower moves over terrain.

In at least some embodiments, mower steering may be provided by one or more actuators operable by an operator to signal whether the operator desires to steer right or left. In the illustrated embodiment, the mower 102 includes a right control actuator 138 and a left control actuator 140. As illustrated, the actuators 138, 140 can be shaped as movable lap bars pivotably secured to the chassis 112, while in other embodiments, the actuators can take various other forms, including a single arm capable of actuation to the left or right, or a pair of foot operated actuators. In other embodiments still, steering mechanisms other than actuators may be utilized. In an embodiment including actuator steering, movement of the right or left control actuator 138, 140 forward or backward may communicate to at least one drive wheel controller (not shown) to signal an electric drive wheel motor 142 to rotate a corresponding drive wheel 122 forward or backward. If one of the control actuators 138, 140 is not actuated, while the other is actuated, one of the drive wheels 122 will not rotate, thereby allowing for zero-turn capability. In certain embodiments, the drive wheel controllers may also provide power received from the battery packs 126 to the electric drive wheel motors 142, and thus, provide the travel speed for the mower 102. In at least some embodiments, the electric drive wheel motors 142 are P/N E3258-420, as manufactured by Auburn Gear, LLC, located in Auburn, Ind.

Figure 11:
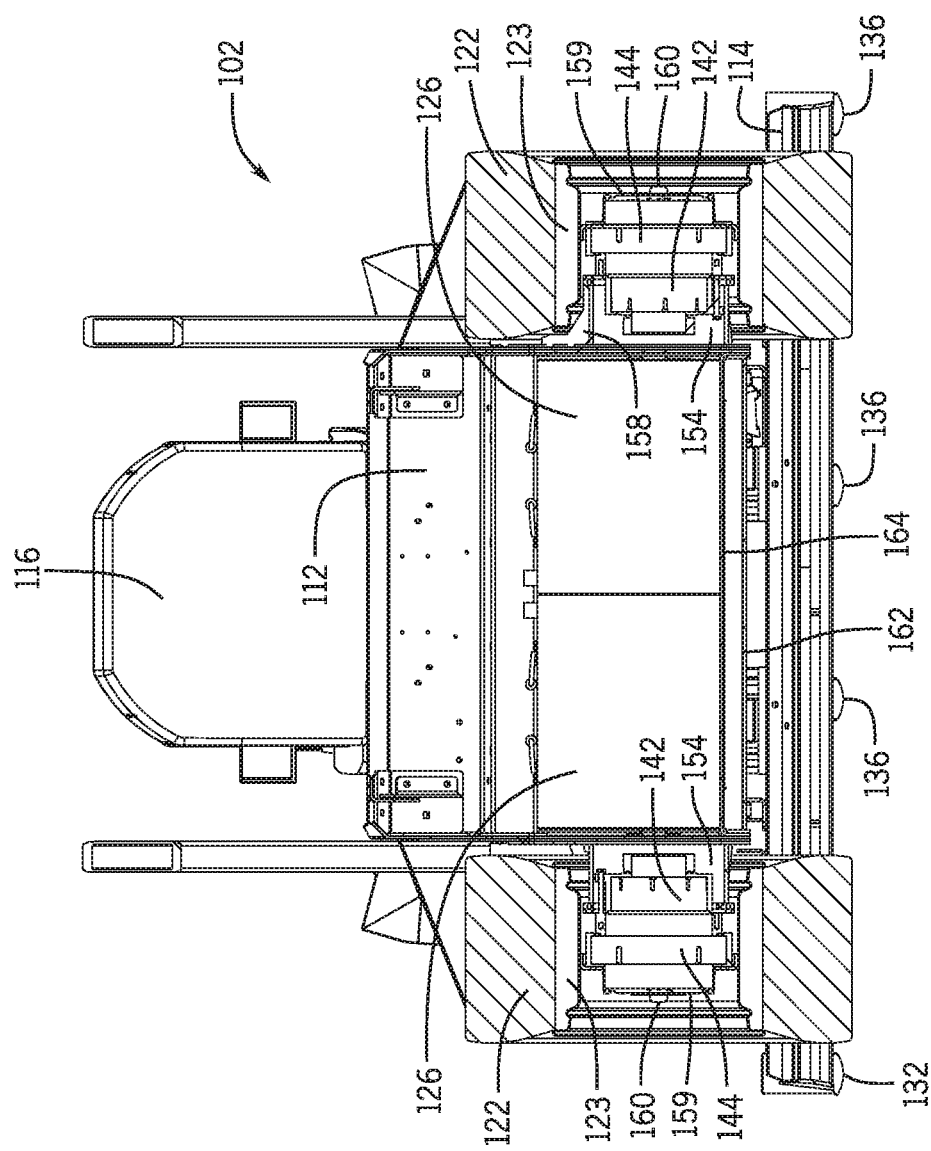
FIG. 11 is a cross-sectional rear elevation view of the mower of FIG. 7 taken along line 11-11 of FIG. 7.
Figure 12:
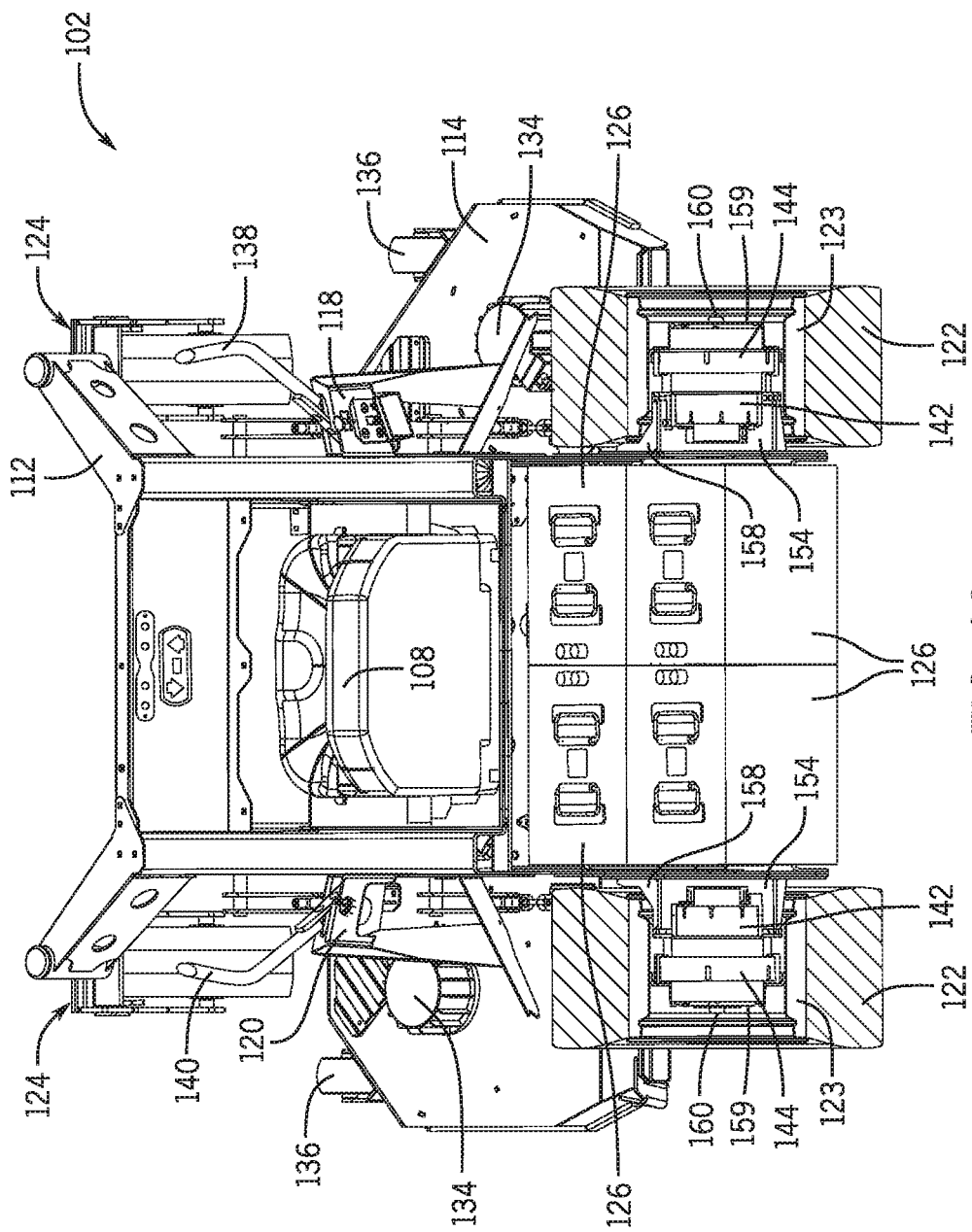
FIG. 12 is a sectional top perspective view of the mower of FIG. 7 taken along line 12-12 of FIG. 7.
Figure 13:
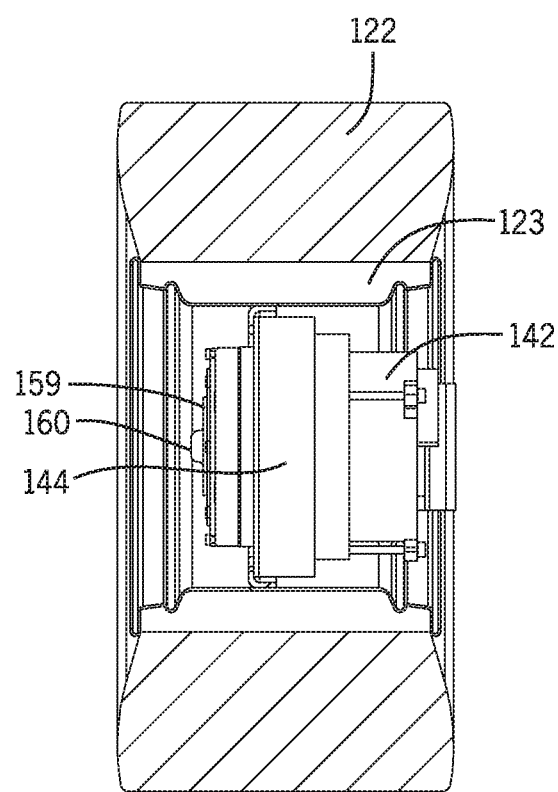
FIG. 13 is an enlarged cross-sectional rear elevation view of the left-side drive wheel and associated parts of the mower shown in FIG. 11.
Figure 14:
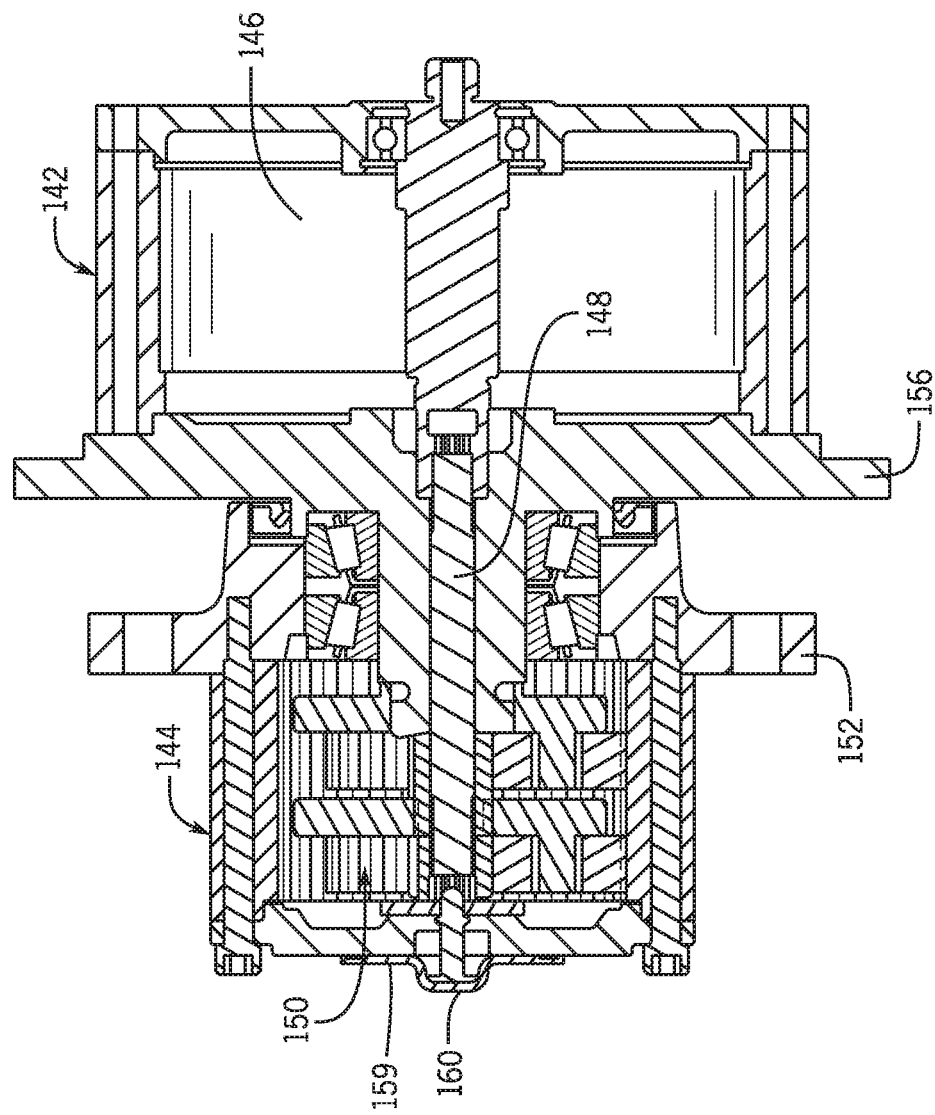
FIG. 14 is an enlarged cross-sectional view of the left-side gear reduction box, drive wheel motor, and associated parts of the mower of FIG. 7, taken along line 11-11.

Referring to FIGS. 11-14, the electric drive wheel motor 142 is mechanically coupled to a gear reduction box 144. As shown in detail in FIG. 14, a stator 146 of the electric drive wheel motor 142 turns a shaft 148 that axially traverses the gear reduction box 144, the shaft 148 turning a series of planetary gears 150 within the gear reduction box 144. The gear reduction box 144 and electric drive wheel motor 142 are sized to fit and positioned at least in part within the drive wheel 122 (FIGS. 11-13). The planetary gear configuration of the gear reduction box 144 is one means by which to increase the compactness of the gear reduction box. In the embodiment shown, the gear reduction box 144 is mounted to a rim 123 of the drive wheel 122 by a drive wheel mounting flange 152. The stator 146 of the electric drive wheel motor 142 is mounted to a drive mount tube 154 by a tube mounting flange 156, the drive mount tube 154 being secured to the chassis 112 by a plurality of gussets 158. Thus, in the illustrated embodiment, as the drive wheel 122 rotates, the gear reduction box 144 coincidingly rotates with the drive wheel 122, while the stator 146 remains secured against rotation with respect to the chassis 112. In the embodiment shown, the drive mount tube 154 protrudes part way into the drive wheel 122 and surrounds at least a portion of the drive wheel motor 142.

Figures 7, 7A:
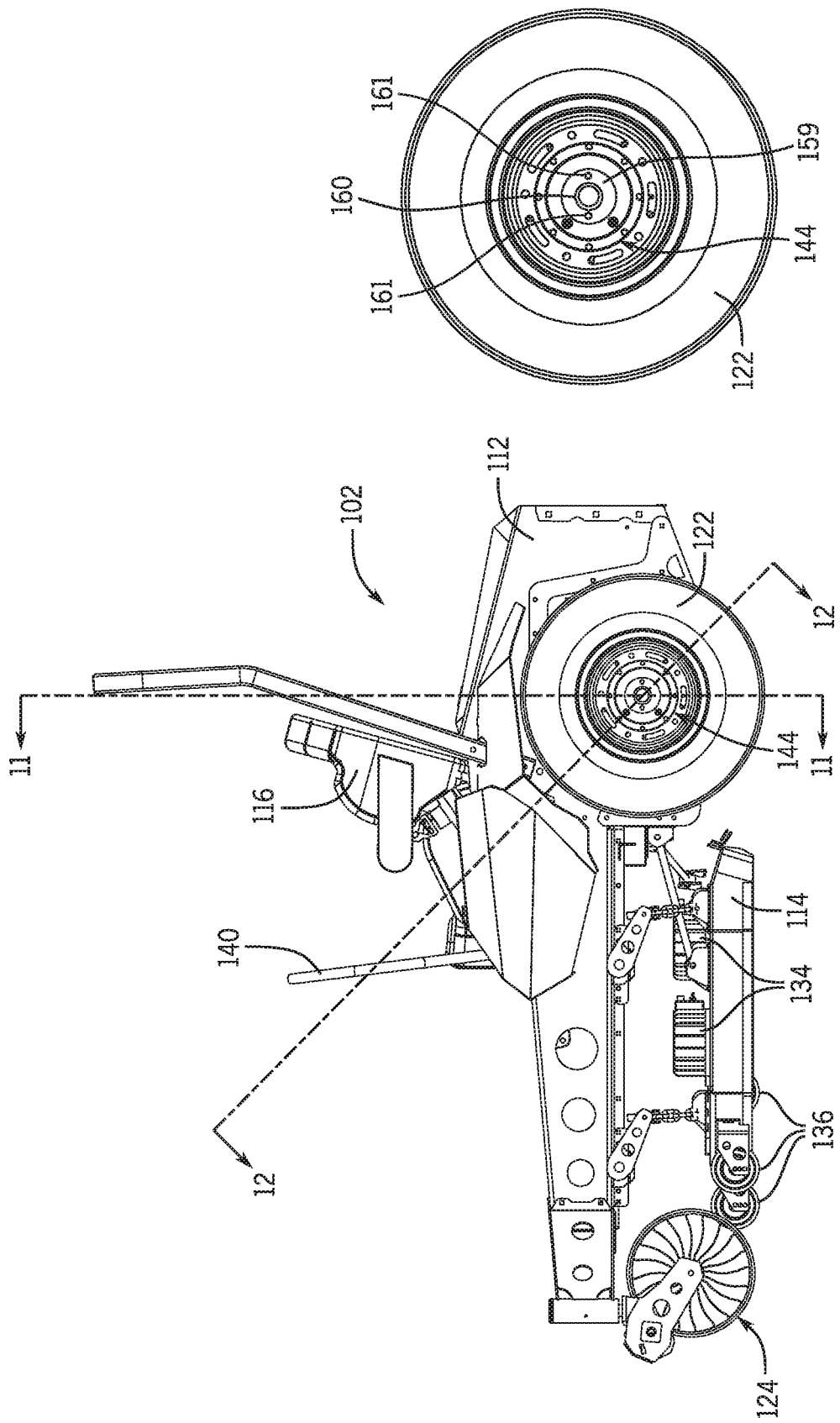
FIG. 7 is a left side elevation view of the mower of FIG. 3.
FIG. 7A is an enlarged left side elevation view of the drive wheel and gear reduction box shown in FIG. 7.

In at least some embodiments, the gear reduction box 144 may additionally include an externally accessible disengaging mechanism to disengage the gear reduction box 144 from the electric drive wheel motor 142 from outside the chassis 112. In the embodiment shown, the disengaging mechanism includes an external plate 159 of the gear reduction box 144, having a protruding portion 160, shown also in FIG. 7A, from a side elevation perspective. When desiring to disengage the gear reduction box 144, the operator may remove the external plate 159, reverse the plate 159, such that the protruding portion 160 now faces the interior of the chassis 112, and reconnect the external plate 159 to the gear reduction box 144. Referring to FIG. 7A, in the present embodiment, the plate 159 is removed by removing two bolts 161. However, in other embodiments, a different number of bolts or a different method of securement may be employed. Referring back to FIGS. 13-14, when the external plate 159 is reconnected in the reverse direction, the protruding portion 160 pushes in on the electric drive motor shaft 148, to disengage the gear reduction box 144 from the electric drive wheel motor 142. The option to disengage the gear reduction box 144 from the exterior of the chassis 112 saves the operator the time and effort of having to enter the interior of the chassis 112 to achieve such disengagement. Thus, should the mower 102 lose battery power, the mower 102 may readily be brought into a state where the drive wheels 122 may rotate when the mower 102 is pushed, even if an internal braking mechanism is engaged with respect to the electric drive wheel motor 142.

In the present embodiment, the drive wheel 122 has an overall width of approximately 12 inches, and the gear reduction box 144 and electric drive wheel motor 142 have a combined axial width of approximately 9 inches, capable of being positioned completely within the width of the drive wheel 122. In certain other embodiments, the combined axial width of the electric drive wheel motor 142 and the gear reduction box 144 may vary, as may the width of the drive wheel 122. In some embodiments, the width of the electric drive wheel motor 142 may protrude beyond the width of the drive wheel 122; for example, in some embodiments, the width of the electric drive wheel motor 142 may be positioned 90 percent within the width of the drive wheel, etc. In such an embodiment, the drive mount tube 154 may be lengthened and the drive wheel 122 may be accordingly offset from the chassis 112.

Figure 7B:
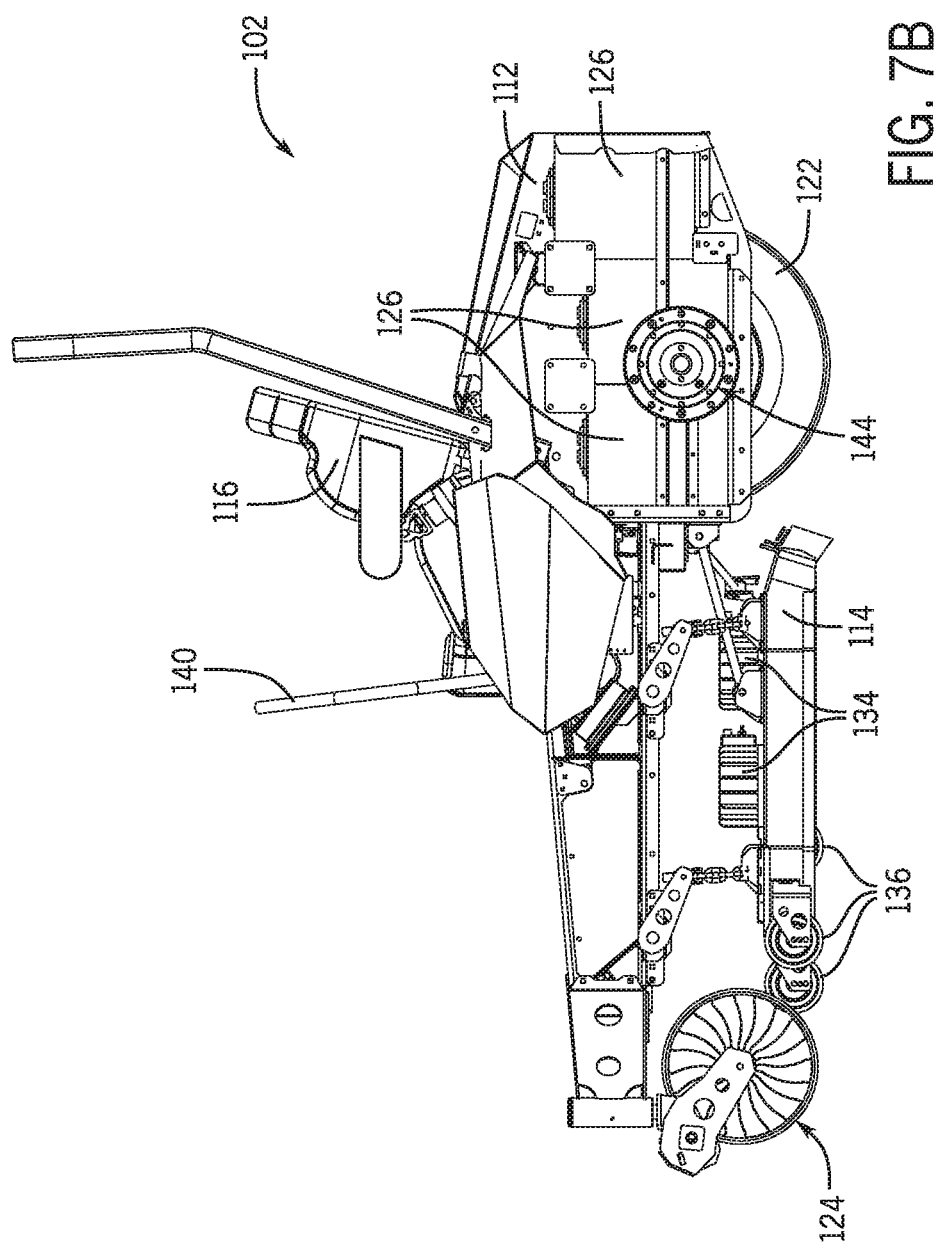
FIG. 7B is a left side elevation view of the mower of FIG. 7 with the left-side drive wheel and select parts of the chassis removed to show the battery packs.
Figure 8:
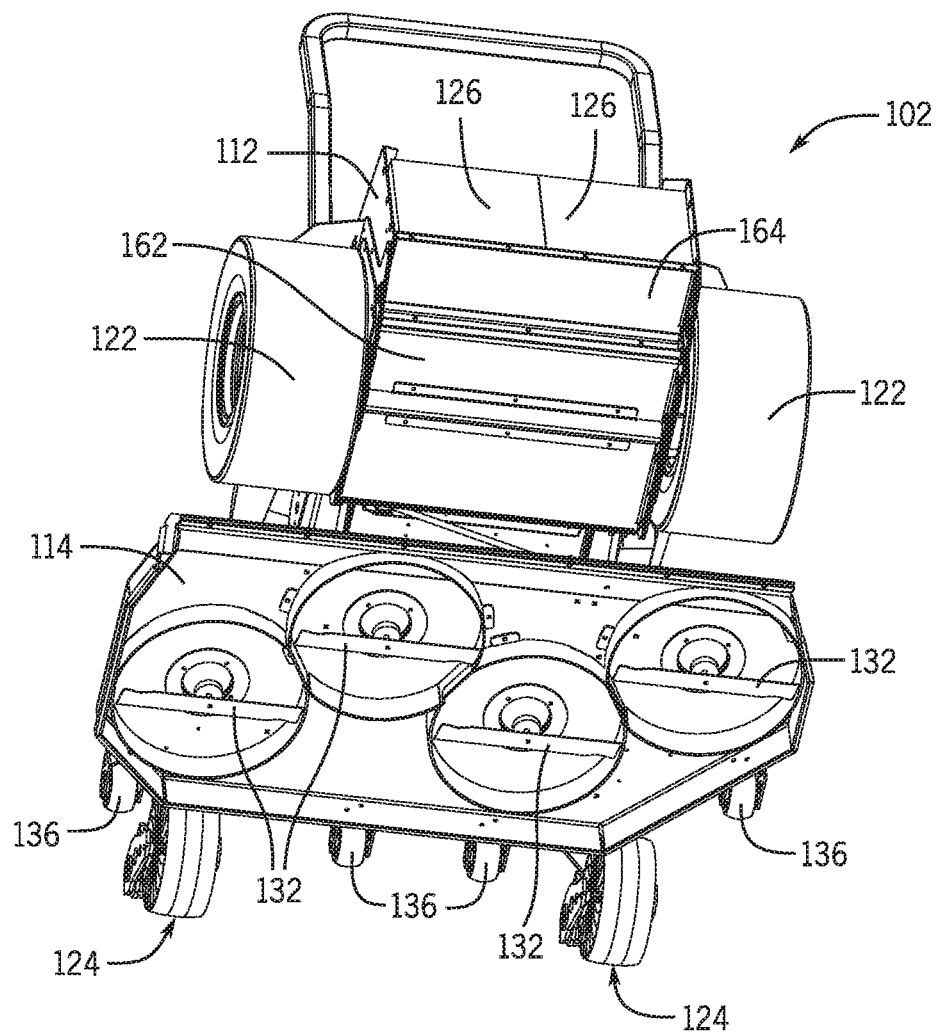
FIG. 8 is a bottom rear perspective view of the mower of FIG. 3.
Figure 9:
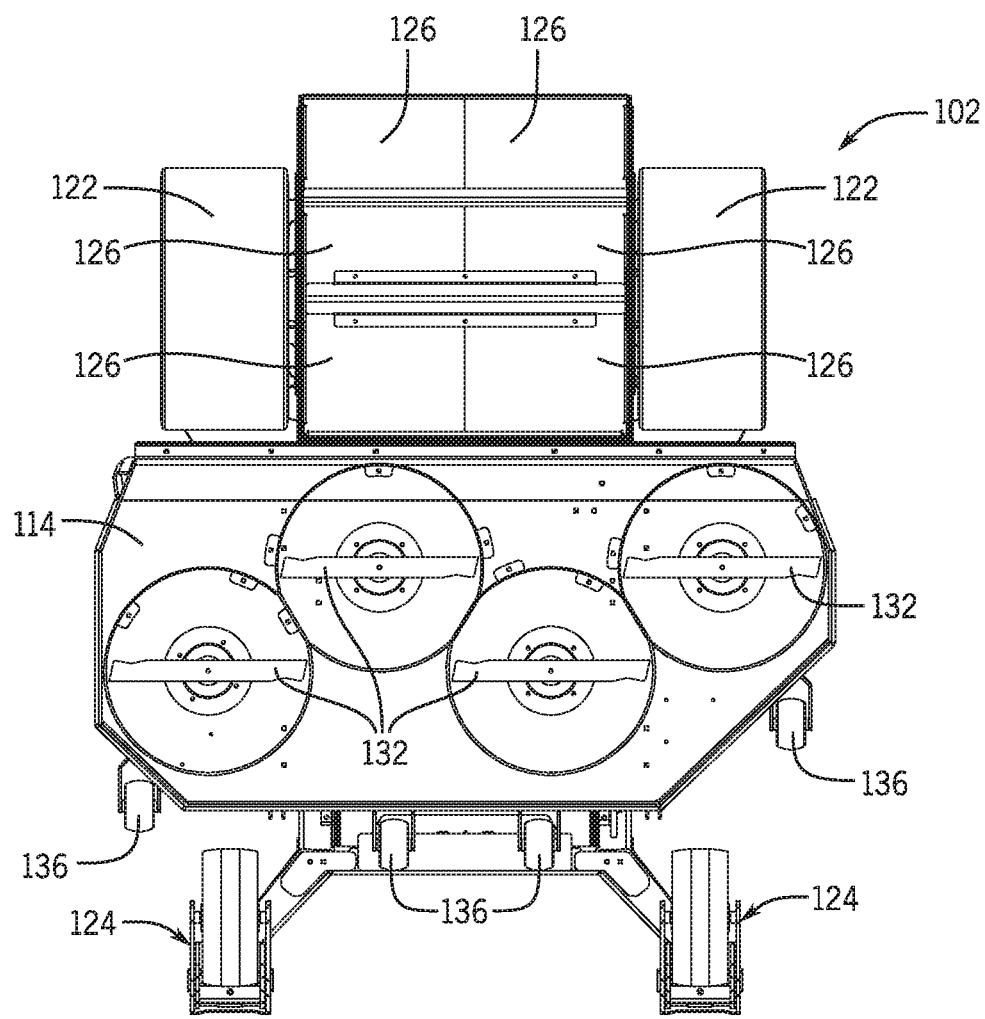
FIG. 9 is a bottom plan view of the mower of FIG. 3 with select parts of the chassis removed to show the battery packs.
Figure 10:
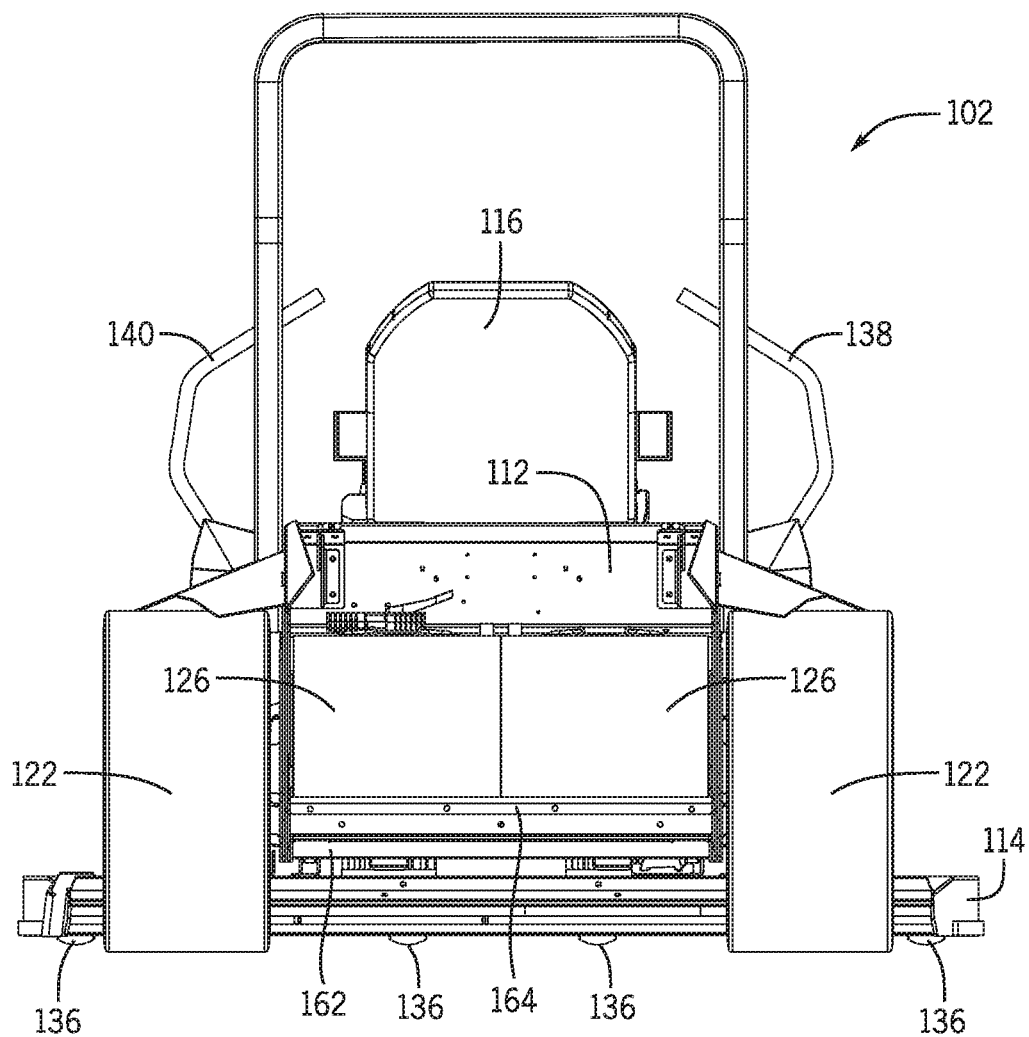
FIG. 10 is a rear elevation view of the mower of FIG. 3.

In the present embodiment, the exterior mounting of the gear reduction boxes 144 and the electric drive wheel motors 142 allows the battery packs 126 of the present embodiment to be positioned between the drive wheel motors 142, thus lowered to an improved height relative to a ground surface as compared to the prior art, thus lowering the center of gravity of the mower 102. Lowering the center of gravity of the mower 102 increases the stability of the mower 102 and increases the bank angle at which the mower 102 may safely travel without overturning. Further, locating the electric drive wheel motors outside the chassis 112 allows one or more of the battery packs 126, at the lowered height, to, in some embodiments, be moved toward the front 110 of the mower 102 into a position underneath the operator support 116, as best shown in FIG. 7B, shortening the permissible length of the mower 102. A shorter mower 102 can lead to such benefits as decreased material costs during production, decreased weight, and increased compactness for greater ease of storage and maneuvering.

In the illustrated embodiment, the four battery packs 126 positioned closest to the front 110 of the mower 102 rest on a front battery floor 162, while the two battery packs closest to the rear 104 of the mower 102, rest on a rear battery floor 164. In other embodiments, each battery floor 162, 164 may support the same or a different number of battery packs 126. In the present embodiment, the rear battery floor 164 is elevated about two to three inches above the front battery floor 162, which is positioned approximately six inches from the ground surface. Elevating the rear battery floor 164 slightly above the front battery floor 162 with respect to the ground surface provides improved clearance when the mower 102 is traveling up hills, over curves or drops, or over big bumps or holes where one or both of the rear wheels may drops abruptly. However, this express battery floor configuration is not required by the present disclosure. In other embodiments, the relative heights of the battery floors 162, 164 may vary and more or fewer battery floors may be utilized. For instance, in certain embodiments, the rear battery floor may be lowered closer to the ground surface and angled upwards away from the ground surface in the rearward direction, or a single battery floor may be used and similarly angled upwards away from the ground surface in the rearward direction, such that the rear of a battery back positioned on such a sloped battery floor is slightly elevated above the front of the battery pack.

When more than one battery pack 126 is utilized, the battery packs 126 may be electrically interconnected to supply their power jointly. The interconnection can be either a parallel or series connection. Some embodiments may include a main battery disconnect 127 that may be used to connect or disconnect the battery power from the mower. Each battery pack 126 can include one or more removable portions situated therein, each portion including one or more battery cells (not shown). The battery packs 126 can be modular, allowing them to be easily replaceable with another battery pack having an identical size and shape. Some embodiments may include battery packs 126 that are readily removable. Other embodiments may include battery packs 126 that are fixed in place, with less ease of removability. The battery packs 126 may or may not be situated in a readily accessible location. Although, when the battery packs 126 are situated in a readily accessible location, as illustrated herein, an operator can easily add multiple battery packs 126 to increase operating time or power. In addition, more efficient accessibility to the battery packs 126 may allow an operator to quickly swap out a discharged battery pack 126 for a charged battery pack 126 and resume operation without having to wait for internal batteries to charge.

In at least some embodiments, the battery packs 126 are comprised of lithium-based battery cells, capable of maintaining a near constant voltage for the duration of their state of charge. Although in other embodiments, other battery packs 126 can be compromised of other types of battery cells, such as Nickel-based, Lead acid based, etc. When lithium-based, for example, the battery packs 126 require no fluid refills or maintenance. The battery packs can be designed to store enough power to operate the mower 102 for commercial all day operations on one charge.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A battery-operated mower comprising:
   a chassis;
   a drive wheel motor connected to an exterior portion of the chassis by a drive mount tube;
   a gear reduction box mechanically coupled to the drive wheel motor, the gear a gear reduction box comprising:
      a plurality of gears arranged in a planetary configuration, and
      a disengaging mechanism actuatable from an externally accessible face of the gear reduction box, the disengaging mechanism configured to disengage the gear reduction box from the drive wheel motor when actuated by the operator;
   a drive wheel connected to the gear reduction box; and
   a battery pack electrically connected to the drive wheel motor and positioned at least in part within the same horizontal plane as the drive wheel motor,
   and wherein the at least a portion of the gear reduction box is positioned within the drive wheel,
   and wherein the drive wheel motor further comprises a shaft that axially traverses the gear reduction box, and wherein the disengagement mechanism comprises a reversible plate having a first face facing the exterior of the chassis when the gear reduction box is engaged with the drive wheel motor and a second face facing the interior of the chassis when the gear reduction box is engaged with the drive wheel motor, the first face having a protruding portion positioned such that when the plate is reversed, the protruding portion pushes on the shaft with sufficient force to disengage the gear reduction box from the drive wheel motor.

2. A battery-operated mower comprising:
   a chassis;
   an operator support connected to the chassis for supporting an operator;
   a first electric drive wheel motor secured to a first exterior surface of the chassis;
   a first planetary gear reduction box mechanically coupled to the first electric drive wheel motor, the first planetary gear reduction box including a first system of planetary gears;
   a first drive wheel secured to the first planetary gear reduction box, the first drive wheel surrounding at least a portion of the first electric drive wheel motor and at least a portion of the first planetary gear reduction box;
   a second electric drive wheel motor secured to a second exterior surface of the chassis;
   a second planetary gear reduction box mechanically coupled to the second electric drive wheel motor, the second planetary gear reduction box including a second system of planetary gears;
   a second drive wheel secured to the second planetary gear reduction box, the second drive wheel surrounding at least a portion of the second electric drive wheel motor and at least a portion of the second planetary gear reduction box;
   a first battery pack supported by the chassis, electrically connected to the first electric drive wheel motor and the second electric drive wheel motor, the first battery pack positioned at least in part between the first electric drive wheel motor and the second electric drive wheel motor; and
   a second battery pack,
   and wherein the chassis includes a first battery floor supporting the first battery pack, the first battery floor positioned at a first height relative to a ground surface, and a second battery floor supporting the second battery pack, the second battery floor positioned at a second height relative to the ground surface.

3. The mower of claim 2, wherein the second battery pack is positioned at least in part underneath the operator support.

4. The mower of claim 3, wherein the first planetary gear reduction box further includes a first exterior face and a first disengaging mechanism actuatable from the first exterior face, and the second planetary gear reduction box further includes a second exterior face and a second disengaging mechanism actuatable from the second exterior face, the first disengaging mechanism configured to disengage the first planetary gear reduction box from the first electric drive wheel motor when actuated by the operator and the second disengaging mechanism configured to disengage the second planetary gear reduction box from the second electric drive wheel motor when actuated by the operator.

* * * * *